US012790472B2

(12) United States Patent
Kahlen et al.

(10) Patent No.: US 12,790,472 B2
(45) Date of Patent: Nov. 10, 2026

(54) POLYPROPYLENE-POLYETHYLENE BLENDS WITH IMPROVED PROPERTIES

(71) Applicant: Borealis AG, Vienna (AT)

(72) Inventors: Susanne Margarete Kahlen, Linz (AT); Hermann Braun, Linz (AT); Yi Liu, Linz (AT); Meta Cigon, Vienna (AT); Philip Knapen, Beringen (BE)

(73) Assignee: BOREALIS AG, Vienna (AT)

( * ) Notice: Subject to any disclaimer, the term of this patent is extended or adjusted under 35 U.S.C. 154(b) by 1292 days.

(21) Appl. No.: 17/635,764

(22) PCT Filed: Aug. 4, 2020

(86) PCT No.: PCT/EP2020/071843
§ 371 (c)(1),
(2) Date: Feb. 16, 2022

(87) PCT Pub. No.: WO2021/032458
PCT Pub. Date: Feb. 25, 2021

(65) Prior Publication Data

US 2022/0289955 A1 Sep. 15, 2022

(30) Foreign Application Priority Data

Aug. 19, 2019 (EP) .................................... 19192200

(51) Int. Cl.
*C08L 23/12* (2006.01)
*C08L 23/06* (2006.01)

(52) U.S. Cl.
CPC ............... *C08L 23/12* (2013.01); *C08L 23/06* (2013.01); *C08L 2207/02* (2013.01); *C08L 2207/20* (2013.01)

(58) Field of Classification Search
CPC ...... C08L 23/12; C08L 23/06; C08L 2207/02; C08L 2207/20
USPC .......................................................... 524/324
See application file for complete search history.

(56) References Cited

U.S. PATENT DOCUMENTS 5,266,392 A 11/1993 Land et al.
5,767,230 A 6/1998 Scarola et al.
5,811,494 A 9/1998 Whetten et al.
9,637,602 B2 5/2017 Potter et al.
9,670,293 B2 6/2017 Reznichenko et al.
9,670,347 B2 6/2017 Tölsch et al.
9,708,481 B2 7/2017 Wang et al.
9,745,431 B2 8/2017 Potter et al.
9,751,962 B2 9/2017 Wang et al.
9,777,142 B2 10/2017 Sandholzer et al.
9,802,394 B2 10/2017 Cavacas et al.
9,828,698 B2 11/2017 Wang et al.
9,890,275 B2 2/2018 Sandholzer et al.
9,976,020 B2 5/2018 Nummila-Pakarinen et al.
10,011,708 B2 7/2018 Lampela et al.
10,030,109 B2 7/2018 Boragno et al.
10,040,930 B2 8/2018 Gloger et al.
10,100,185 B2 10/2018 Wang et al.
10,100,186 B2 10/2018 Wang et al.
10,227,427 B2 3/2019 Reichelt et al.
10,450,451 B2 10/2019 Wang et al.
10,519,259 B2 12/2019 Resconi et al.
10,870,718 B2 12/2020 Denifl et al.
11,292,900 B2 4/2022 Gahleitner et al.
11,299,617 B2 4/2022 Prieto et al.
11,390,732 B2 7/2022 Van Houcke et al.
11,492,478 B2 11/2022 Kniesel et al.
11,504,949 B2 11/2022 Oderkerk et al.
11,518,863 B2 12/2022 Vijay
11,530,321 B2 12/2022 Kniesel et al.
11,827,758 B2 11/2023 Jerabek et al.
11,827,777 B2 11/2023 Wang et al.
11,834,529 B2 12/2023 Wang et al.
11,851,552 B2 12/2023 Gloger et al.
2005/0127558 A1 6/2005 Subramanian et al.
2009/0048403 A1* 2/2009 Costantini ........... B29B 17/0042
525/240

(Continued)

FOREIGN PATENT DOCUMENTS

CN 106232707 A 12/2016
CN 108025826 A 5/2018

(Continued)

OTHER PUBLICATIONS

"List of 'Purpolen' Products," Borealisgroup.com (3 pgs.) (retrieved Feb. 20, 2024) www.borealisgroup.com/search/results?q=purpolen.
Nilsson et al., "Inter-laboratory studies for the validation of solid-phase microextraction for the quantitative analysis of volatile organic compounds in aqueous samples," *Analytica Chimica Acta* 356: 113-123 (1997).
Grounds of Opposition filed in EP Patent No. 4 017 916 B1 (Feb. 22, 2024) 33 pgs.
Notice of Opposition filed in EP Patent No. 4 017 916 B1 (Feb. 22, 2024) 15 pgs.
Korean Intellectual Property Office, Notice to Submit a Response in Korean Patent Application No. 10-2022-7008341 (Dec. 7, 2023).

(Continued)

*Primary Examiner* — Kelechi C Egwim
(74) *Attorney, Agent, or Firm* — Leydig, Voit & Mayer, Ltd.

(57) ABSTRACT

Disclosed is a polymer composition comprising at least the following components A) 20 to 75 wt.-% based on the overall weight of the polymer composition of a polymer blend, comprising a1) polypropylene; a2) polyethylene; wherein the weight ratio of a1) to a2) is from 3:7 to 12:1; and wherein the polymer blend A) is a recycled material; B) 25 to 80 wt.-% based on the overall weight of the polymer composition of a virgin heterophasic polypropylene block copolymer; wherein that the weight proportions of A) and B) add up to 100 wt.-%. Also disclosed are a process for manufacturing the polymer composition and articles comprising the polymer composition.

9 Claims, No Drawings

(56) References Cited

U.S. PATENT DOCUMENTS

2013/0005902 A1* 1/2013 Doshev .................. C08F 10/06 525/240
2016/0185946 A1 6/2016 Sandholzer et al.
2016/0194486 A1 7/2016 Sandholzer et al.
2016/0200838 A1 7/2016 Reznichenko et al.
2016/0208085 A1 7/2016 Gloger et al.
2016/0229158 A1 8/2016 Cavacas et al.
2016/0237270 A1 8/2016 Wang et al.
2016/0244539 A1 8/2016 Resconi et al.
2016/0272740 A1 9/2016 Wang et al.
2016/0280899 A1 9/2016 Töltsch et al.
2016/0304681 A1 10/2016 Potter et al.
2016/0311951 A1 10/2016 Reichelt et al.
2016/0311988 A1 10/2016 Potter et al.
2016/0312018 A1 10/2016 Vestberg et al.
2016/0312019 A1 10/2016 Lampela et al.
2016/0326355 A1* 11/2016 Marques Ferreira Custodio ........ C08L 23/12
2016/0347943 A1 12/2016 Wang et al.
2016/0347944 A1 12/2016 Wang et al.
2017/0009068 A1 1/2017 Kahlen et al.
2017/0029980 A1 2/2017 Wang et al.
2017/0137617 A1 5/2017 Wang et al.
2017/0166711 A1 6/2017 Boragno et al.
2017/0218172 A1 8/2017 Wang et al.
2017/0313867 A1 11/2017 Lampela et al.
2017/0321048 A1 11/2017 Nummila-Pakarinen et al.
2018/0079875 A1 3/2018 Braun et al.
2018/0194881 A1 7/2018 Denifl et al.
2020/0263013 A1* 8/2020 De Palo ................. C08L 23/12
2020/0263015 A1 8/2020 Kniesel et al.
2020/0270434 A1 8/2020 Van Houcke et al.
2020/0277479 A1 9/2020 Jerabek et al.
2020/0308353 A1 10/2020 Jerabek et al.
2020/0308385 A1 10/2020 Gahleitner et al.
2020/0347216 A1 11/2020 Kniesel et al.
2020/0385555 A1* 12/2020 Kahlen .................. C08L 23/10
2020/0392321 A1 12/2020 Gahleitner et al.
2021/0114352 A1 4/2021 Oderkerk et al.
2021/0171749 A1 6/2021 Kumar et al.
2021/0171750 A1 6/2021 Gahleitner et al.
2021/0214527 A1 7/2021 Gahleitner et al.
2021/0214533 A1 7/2021 Kulshreshtha et al.
2021/0238376 A1 8/2021 Kahlen et al.
2021/0253836 A1 8/2021 Gahleitner et al.
2021/0269560 A1 9/2021 Krallis et al.
2021/0324189 A1 10/2021 Prieto et al.
2021/0332227 A1 10/2021 Wang et al.
2021/0347971 A1 11/2021 Wang et al.
2022/0033631 A1 2/2022 Gloger et al.
2022/0135779 A1 5/2022 Wang et al.
2022/0204719 A1 6/2022 Vijay
2022/0227965 A1 7/2022 Ruemer et al.
2022/0251256 A1 8/2022 Wang et al.
2022/0306844 A1 9/2022 Kahlen et al.
2022/0315716 A1 10/2022 Prieto et al.
2022/0356330 A1 11/2022 Kahlen et al.
2023/0046086 A1 2/2023 Al-Haj Ali et al.
2023/0047329 A1 2/2023 Al-Haj Ali
2023/0212338 A1 7/2023 Wang et al.

FOREIGN PATENT DOCUMENTS

CN 114672092 A 6/2022
EP 0 491 566 A2 6/1992
EP 0 586 390 B1 5/1997
EP 0 591 224 B1 2/1998
EP 0 847 420 A1 6/1998
EP 0 887 379 A1 12/1998
EP 2 610 270 A1 7/2013
EP 2 610 271 A1 7/2013
EP 2 610 272 A1 7/2013
EP 2 516 125 B1 2/2014
EP 3 715 410 A1 9/2020
KR 1020180066257 A 6/2018
WO WO 92/12182 A1 7/1992
WO WO 97/08238 A1 3/1997
WO WO 99/24478 A1 5/1999
WO WO 99/24479 A1 5/1999
WO WO 00/68315 A1 11/2000
WO WO 2004/000899 A1 12/2003
WO WO 2004/111095 A1 12/2004
WO WO 2007/071494 A1 6/2007
WO WO 2012/007430 A1 1/2012
WO WO 2015/011135 A1 1/2015
WO WO 2015/091810 A1 6/2015
WO WO 2015/169690 A1 11/2015
WO WO 2017/076933 A1 5/2017
WO WO 2018/206353 A1 11/2018
WO WO 2019/091886 A1 5/2019
WO WO 2019/091887 A1 5/2019
WO WO 2019/224229 A1 11/2019
WO WO-2019224129 A1 * 11/2019 ............. C08L 23/10
WO WO 2020/070175 A1 4/2020
WO WO 2020/070176 A1 4/2020
WO WO 2021/144401 A1 7/2021
WO WO 2021/233818 A1 11/2021

OTHER PUBLICATIONS

U.S. Appl. No. 15/310,283, filed May 18, 2015.
U.S. Appl. No. 16/761,743, filed May 5, 2020.
U.S. Appl. No. 16/761,757, filed May 5, 2020.
U.S. Appl. No. 16/652,115, filed Mar. 30, 2020.
U.S. Appl. No. 16/768,330, filed May 29, 2020.
U.S. Appl. No. 16/982,385, filed Sep. 18, 2020.
U.S. Appl. No. 17/047,350, filed Oct. 13, 2020.
U.S. Appl. No. 17/276,322, filed Mar. 15, 2021.
U.S. Appl. No. 17/624,609, filed Jan. 4, 2022.
U.S. Appl. No. 17/791,987, filed Jan. 7, 2021.
U.S. Appl. No. 17/792,003, filed Jan. 7, 2021.
U.S. Appl. No. 17/995,997, filed Apr. 9, 2021.
Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28: 1128-1134 (2007).
Cheng, "$^{13}$C NMR Analysis of Ethylene-Propylene Rubbers," *Macromolecules* 17:1950-1955 (1984).
Gahleitner et al., "Heterophasic copolymers of polypropylene: Development, design principles, and future challenges," *Journal of Applied Polymer Science* 130(5): 3028-3037 (2013).
Singh et al., "Triad sequence determination of ethylene-propylene copolymers—application of quantitative $^{13}$C NMR," *Polymer Testing* 28(5): 475-479 (2009).
Wang et al., "Structural Analysis of Ethylene/Propylene Copolymers Synthesized with a Constrained Geometry Catalyst," *Macromolecules* 33: 1157-1162 (2000).
Zhou et al., "A new decoupling method for accurate quantification of polyethylene copolymer composition and triad sequence distribution with $^{13}$C NMR," *J. Magnet. Reson.* 187: 225-233 (2007).
European Patent Office, International Search Report in International Application No. PCT/EP2020/071843 (Oct. 23, 2020).
European Patent Office, Written Opinion in International Application No. PCT/EP2020/071843 (Oct. 23, 2020).
European Patent Office, Written Opinion of the IPEA in International Application No. PCT/EP2020/071843 (May 21, 2021).
International Bureau of WIPO, International Preliminary Report on Patentability in International Application No. PCT/EP2020/071843 (Nov. 30, 2021).
Korean Intellectual Property Office, Notice of Allowance in Korean Patent Application No. 10-2022-7008341 (Aug. 23, 2024).
The Patent Office of the People's Republic of China, First Notification of Office Action issued in Chinese Patent Application No. 202080057775.6 (Feb. 3, 2023).

* cited by examiner

POLYPROPYLENE-POLYETHYLENE BLENDS WITH IMPROVED PROPERTIES

CROSS-REFERENCE TO RELATED APPLICATIONS

This patent application is the U.S. national phase of International Application No. PCT/EP2020/071843, filed on Aug. 4, 2020, which claims the benefit of European Patent Application No. 19192200.4, filed Aug. 19, 2019, the disclosures of which are incorporated herein by reference in their entireties for all purposes.

The present invention relates to a polymer composition comprising as component A) a recycled polymer blend comprising polypropylene and polyethylene and as component B) a virgin heterophasic polypropylene block copolymer, a process for manufacturing said polymer composition and to the use of a virgin heterophasic polypropylene block copolymer B) for increasing mechanical properties of component A).

Polyolefins, in particular polyethylene and polypropylene are increasingly consumed in large amounts in a wide range of applications, including packaging for food and other goods, fibres, automotive components, and a great variety of manufactured articles. The reason for this is not only a favorable price/performance ratio, but also the high versatility of these materials and a very broad range of possible modifications, which allows tailoring of end-use properties in a wide range of applications. Chemical modifications, copolymerisation, blending, drawing, thermal treatment and a combination of these techniques can convert common-grade polyolefins into valuable products with desirable properties. This has led to huge amounts of polyolefin materials being produced for consumer applications.

During the last decade, concern about plastics and the environmental sustainability of their use in current quantities has arisen. This has led to new legislation on disposal, collection and recycling of polyolefins. There have, in addition, been efforts in a number of countries to increase the percentage of plastic materials, which are recycled instead of being sent to landfill.

One major trend in the field of polyolefins is the use of recycled materials, which are derived from a wide variety of sources. Durable goods streams such as those derived from yellow bags, yellow bins, community collections, waste electrical equipment (WEE) or end-of-life vehicles (ELV) contain a wide variety of plastics. These materials can be processed to recover acrylonitrile-butadiene-styrene (ABS), high impact polystyrene (HIPS), polypropylene (PP) and polyethylene (PE) plastics. Separation can be carried out using density separation in water and then further separation based on fluorescence, near infrared absorption or Raman fluorescence. However, it is commonly quite difficult to obtain either pure recycled polypropylene or pure recycled polyethylene. Generally, recycled quantities of polypropylene on the market are mixtures of both polypropylene (PP) and polyethylene (PE), this is especially true for post-consumer waste streams. Commercial recyclates from post-consumer waste sources have been found generally to contain mixtures of PP and PE, the minor component reaching up to <50 wt.-%.

Such recycled polyethylene rich materials normally have properties, which are much worse than those of the virgin materials, unless the amount of recycled polyolefin added to the final compound is extremely low. For example, such materials often have poor performance in odor and taste, limited stiffness, limited impact strength and poor tensile properties and consequently do not fit consumer requirements. Therefore, the current portfolio of recyclates available at European recyclers is still targeting low end applications such as crates, flower pots and benches etc.

Blends comprising polyethylene and polypropylene are already known in the prior art.

U.S. Pat. No. 5,266,392 A relates to compatibilized blends of polypropylene, linear low density polyethylene and a low molecular weight plastomer. The blend preferably contains at least about 50 percent by weight of crystalline polypropylene, from about 10 to about 50 percent by weight of LLDPE dispersed in a matrix of the polypropylene, and a compatibilizing amount of an ethylene/alpha-olefin plastomer having a weight average molecular weight between about 5,000 to about 50,000, a density of less than about 0.90 g/cm$^3$, and a melt index of at least about 50 dg/min. The blend is useful in the formation of melt spun and melt blown fibers. Also disclosed are spun bonded-melt blown-spun bonded fabrics made from the blends.

U.S. Pat. No. 5,811,494 A refers to polymer compositions made from at least one polyolefin (e.g., high density polyethylene or polypropylene) blended with minor amounts of either at least one homogeneous linear ethylene/C5-C20 alpha-olefin or at least one substantially linear ethylene/C3-C20 alpha-olefin polymer. The compositions are suitable for thermoformed or molded thinwall applications such as drinking cups, lids, and food containers where the flow length to wall thickness ratios are greater than about 180:1.

EP 0 847 420 A1 relates to a packaging material or article or medical device, prepared for radiation sterilization of itself, its contents, or combinations, or which has been exposed to radiation sufficient for such sterilization; comprising a blend to from about 99% to about 50% by weight homo or copolymerized polypropylene which includes about 1% to about 50% by weight polyethylene produced by single-site catalysis.

US 2005/127558 A1 refers to a process for the preparation of polypropylene molding compound, which comprises blending polypropylene with another polymer in the range of 20 to 50 wt.-%, adding a compatibilizer, melt kneading the mixture in presence of a low molecular weight copolymer, melt extruding the same in a twin screw melt extruder at a temperature in the range of 120 to 180° C. to give a polypropylene molding compound.

The prior art also describes polymer compositions comprising recyclates and virgin materials.

WO 2015/169690 A1 refers to polypropylene-polyethylene blends comprising A) 75 to 90 wt.-% of a blend of A-1) polypropylene and A-2) polyethylene and B) 10 to 25 wt.-% of a compatibilizer being a heterophasic polyolefin composition comprising B-1) a polypropylene with an MFR2 between 1.0 and 300 g/10 min (according to ISO 1133 at 230° C. at a load of 2.16 kg) and B-2) a copolymer of ethylene and propylene or C4 to C10 alpha olefin with a Tg (measured with dynamic-mechanical thermal analysis, DMTA, according to ISO 6721-7) of below −25° C. and an intrinsic viscosity (measured in decalin according to DIN ISO 1628/1 at 135° C.) of at least 3.0 dl/g, whereby the blend has simultaneously increased Charpy Notched Impact Strength (according to ISO 179-1eA, measured at 23° C.), Flexural Modulus (according to ISO 178) as well as heat deflection resistance (determined with DMTA according to ISO 6721-7).

The known polymer compositions comprising recycled materials are not suited for a high-end market and inter alia due to their mechanical properties they are not able to compete with virgin materials. In addition, the available recyclates are facing problems in composition, for example fluctuation in PP and PE content, in consistency (in terms of flow properties), in their property profile (poor stiffness-impact balance), and in cross-contamination (such as non-polyolefinic components, inorganic materials such as aluminum or paper) but also in color and odor. Furthermore, the long-term stabilization of the materials known from the prior art is not so good that the materials could be subjected to further re-processing or recycling processes.

It was the objective of the present invention to overcome the disadvantages of the polymer composition according to the prior art. In particular, it was one object of the present invention to provide polymer compositions having good mechanical properties, like a high toughness, expressed by the Charpy Notched Impact Strength, and a good stiffness, expressed by the Tensile Strain at Break and the Tensile Modulus. Furthermore, it was an object of the present invention to provide a polymer composition which allows to compensate the above-mentioned fluctuations. In addition, it was an object of the present invention to provide polymer compositions having a good long-term stabilization which can be subjected to further re-processing or recycling processes.

These objects have been solved by the polymer composition according to the present invention comprising at least the following components:

A) 20 to 75 wt.-% based on the overall weight of the polymer composition of a polymer blend, comprising
 a1) polypropylene;
 a2) polyethylene;
 wherein the weight ratio of a1) to a2) is from 3:7 to 12:1; and wherein the polymer blend A) is a recycled material;
B) 25 to 80 wt.-% based on the overall weight of the polymer composition of a virgin heterophasic polypropylene block copolymer; whereby said virgin heterophasic polypropylene block copolymer has
 a xylene soluble content (XCS) determined according to ISO 16152 based on the overall weight of component B) in the range of 8 to 30 wt.-%;
 a C2-content in the range of 2.0 to 12.0 wt.-%; and
 a $MFR_2$ (230° C., 2.16 kg) determined according to ISO 1133 in the range of 30 to 55 g/10 min;

with the proviso that the weight proportions of components A) and B) add up to 100 wt.-%.

Advantageous embodiments of the polymer composition in accordance with the present invention are specified herein.

The present invention also relates to a process for manufacturing a polymer composition, comprising the following steps:

i) providing a polymer blend A) of a recycled material comprising a1) polypropylene and a2) polyethylene in a weight ratio of a1) to a2) from 3:7 to 12:1 in an amount of 20 to 75 wt.-% based on the overall weight of the polymer composition;
ii) providing a virgin heterophasic polypropylene block copolymer B) in an amount of 25 to 80 wt.-% based on the overall weight of the polymer composition; whereby said heterophasic polypropylene block copolymer has
 a xylene soluble content (XCS) determined according to ISO 16152 based on the overall weight of component B) in the range of 8 to 30 wt.-%;
 a C2-content in the range from 2.0 to 12.0 wt.-%; and
 a $MFR_2$ (230° C., 2.16 kg) determined according to ISO 1133 in the range of 30 to 55 g/10 min;
iii) melting and mixing components A) and B) to obtain the polymer composition; and
iv) optionally, cooling down the polymer composition obtained in step iii) and/or pelletizing the polymer composition.

Preferred embodiments of the process according to the present invention are also described herein.

The use of a virgin heterophasic polypropylene block copolymer B) is also described herein; whereby said heterophasic polypropylene block copolymer B) has
 a xylene soluble content (XCS) determined according to ISO 16152 based on the overall weight of component B) in the range of 8 to 30 wt.-%;
 a C2-content in the range from 2.0 to 12.0 wt.-%; and
 a $MFR_2$ (230° C., 2.16 kg) determined according to ISO 1133 in the range of 30 to 55 g/10 min;

for increasing the Charpy Notched Impact Strength measured according to ISO 179-1eA at 23° C.; and/or the Tensile Modulus measured according to ISO527-2; and/or the $MFR_2$ (230° C., 2.16 kg) determined according to ISO 1133; of a polymer blend A) of a recycled material comprising a1) polypropylene and a2) polyethylene in a weight ratio of a1) to a2) from 3:7 to 12:1;

whereby the heterophasic polypropylene block copolymer B) is present in amount of 25 to 80 wt.-% based on the overall weight of components A) and B).

Advantageous embodiments of the use of a virgin heterophasic polypropylene block copolymer B) is also described herein, as well as an article comprising the polymer composition according to the present invention and preferred embodiments of said article.

Definitions

Indications of Quantity

The polymer compositions in accordance with the present invention comprise the components A) and B) and optionally additives. The requirement applies here that the components A) and B) and if present the additives add up to 100 wt.-% in sum. The fixed ranges of the indications of quantity for the individual components A) and B) and optionally the additives are to be understood such that an arbitrary quantity for each of the individual components can be selected within the specified ranges provided that the strict provision is satisfied that the sum of all the components A), B) and optionally the additives add up to 100 wt.-%.

For the purposes of the present description and of the subsequent claims, the term "recycled" is used to indicate that the material is recovered from post-consumer waste and/or industrial waste. Namely, post-consumer waste refers to objects having completed at least a first use cycle (or life cycle), i.e. having already served their first purpose and been through the hands of a consumer; while industrial waste refers to the manufacturing scrap which does normally not reach a consumer. In the gist of the present invention "recycled polymers" may also comprise up to 17 wt.-%, preferably up to 3 wt.-%, more preferably up to 1 wt.-% and even more preferably up to 0.1 wt.-% based on the overall weight of the recycled polymer of other components originating from the first use. Type and amount of these components influence the physical properties of the recycled polymer. The physical properties given below refer to the main component of the recycled polymer.

Typical other components originating from the first use are thermoplastic polymers, like polystyrene (PS) and polyamide 6 (PA 6), talc, chalk, ink, wood, paper, limonene and fatty acids. The content of polystyrene and PA 6 in recycled polymers can be determined by Fourier Transform Infrared Spectroscopy (FTIR) and the content of talc, chalk, wood and paper may be measured by Thermogravimetric Analysis (TGA).

The term "virgin" denotes the newly produced materials and/or objects prior to first use and not being recycled. In case that the origin of the polymer is not explicitly mentioned the polymer is a "virgin" polymer.

The term "heterophasic polypropylene block copolymer" is used in the present description and the appended claims synonymously with "heterophasic propylene copolymer" or "PP impact copolymer" as established in the art. In the beginning of the field such materials having a rubber component dispersed within a propylene matrix polymer were also referred to as "block copolymers" from multireactor gas-phase plants (M. Gahleitner, et al., Journal of Applied Polymer Science 2013, Vol. 130(5), pp. 3028-3037).

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Component A)

The polymer composition in accordance with the present invention comprises as component A) 20 to 75 wt.-% based on the overall weight of the polymer composition of a polymer blend, comprising a1) polypropylene; a2) polyethylene; wherein the weight ratio of a1) to a2) is from 3:7 to 12:1; and wherein the polymer blend A) is a recycled material. In some preferred embodiments, the weight ratio of a1) to a2) is from 5:2 to 12:1, preferably from 7:1 to 10:1, more preferably from 8:1 to 9.5:1.

Preferred embodiments of component A) will be discussed in the following.

According to one preferred embodiment of the present invention component A) comprises 80.0 to 99.9 wt.-%, preferably 90.0 to 99.0 wt.-% and more preferably 94.0 to 98.0 wt.-% based on the overall weight of component A) of polypropylene a1) and polyethylene a2).

Another preferred embodiment of the present invention stipulates that component A) comprises less than 5 wt.-%, preferably less than 3 wt.-% and more preferably from 0.01 to 2 wt.-% based on the overall weight of component A) of thermoplastic polymers different from a1) and a2), more preferably less than 4.0 wt.-% PA 6 and less than 5 wt.-% polystyrene, still more preferably component A) comprises 0.5 to 3 wt.-% polystyrene.

According to still another preferred embodiment of the present invention component A) comprises less than 5 wt.-%, preferably less than 4 wt.-% and more preferably from 0.01 to 3 wt.-% based on the overall weight of component A) of talc.

In another preferred embodiment of the present invention component A) comprises less than 4 wt.-%, preferably less than 3 wt.-% and more preferably from 0.01 to 2 wt.-% based on the overall weight of component A) of chalk.

According to another preferred embodiment of the present invention component A) comprises less than 1 wt.-%, preferably less than 0.5 wt.-% and more preferably from 0.01 to 1 wt.-% based on the overall weight of component A) of paper.

Still another preferred embodiment of the present invention stipulates that component A) comprises less than 1 wt.-%, preferably less than 0.5 wt.-% and more preferably from 0.01 to 1 wt.-% based on the overall weight of component A) of wood.

In another preferred embodiment of the present invention component A) comprises less than 1 wt.-%, preferably less than 0.5 wt.-% and more preferably from 0.01 to 1 wt.-% based on the overall weight of component A) of metal.

A further preferred embodiment of the present invention stipulates that component A) comprises 100 ppm or less, based on the overall weight of component A), of limonene, as determined using solid phase microextraction (HS-SPME-GC-MS), such as 0.1 to 100 ppm of limonene. According to a preferred first embodiment, blend (A) has a content of limonene as determined by using solid phase microextraction (HS-SPME-GC-MS) of from 1 ppm to 100 ppm, preferably from 1 ppm to 50 ppm, more preferably from 2 ppm to 50 ppm, most preferably from 3 ppm to 35 ppm. In a second preferred embodiment, blend (A) has a content of limonene as determined by using solid phase microextraction (HS-SPME-GC-MS) of from 0.10 ppm to less than 1 ppm, preferably 0.10 to 0.85 ppm, most preferably 0.10 to 0.60 ppm.

Limonene is conventionally found in recycled polyolefin materials and originates from packaging applications in the field of cosmetics, detergents, shampoos and similar products. Therefore, blend (A) contains limonene, when blend (A) contains material that originates from such types of domestic waste streams. In the above second preferred embodiment, blend (A) has a content of limonene as determined by using solid phase microextraction (HS-SPME-GC-MS) of from 0.10 ppm to less than 1 ppm, preferably 0.10 to 0.85 ppm, most preferably 0.10 to 0.60 ppm. Blend (A) according to this second preferred embodiment can be prepared by subjecting blend (A) according to the above first preferred embodiment to washing and/or aeration. Washing can be effected by industrial washers such as provided by Herbold Meckesheim GmbH. Depending on the origin of the waste stream, several washing cycles may be necessary. Various aeration processes such as described in U.S. Pat. No. 5,767,230 are also known in the art. U.S. Pat. No. 5,767,230 is incorporated by reference herewith. The process as described in U.S. Pat. No. 5,767,230 is preferably combined with a washing stage as described above.

According to a further preferred embodiment of the present invention component A) comprises 200 ppm or less, preferably from 1 to 200 ppm based on the overall weight of component A) of fatty acids. In another embodiment, component A) comprises less than 200 ppm of fatty acids, based on the overall weight of component A).

Still another preferred embodiment of the present invention stipulates that component A) is a recycled material, which is recovered from waste plastic material derived from post-consumer and/or post-industrial waste.

According to a further preferred embodiment of the present invention the $MFR_2$ (230° C., 2.16 kg) determined according to ISO 1133 of component A) is in the range of 16 to 50 g/10 min and preferably in the range of 18 to 22 g/10 min.

In a further preferred embodiment of the present invention the Charpy Notched Impact Strength measured according to ISO 179-1eA at 23° C. of component A) is more than 3.0 $kJ/m^2$, preferably in the range from 4.0 to 7.0 $kJ/m^2$ and more preferably in the range from 5.0 to 6.0 $kJ/m^2$.

A further preferred embodiment of the present invention stipulates that the Tensile Modulus measured according to ISO527-2 of component A) is in the range of 800 to 1500 MPa and preferably in the range of 1100 to 1400 MPa.

According to still another preferred embodiment of the present invention the content of component A) in the polymer composition is in the range of 40 to 60 wt.-%, preferably in the range of 45 to 55 wt.-%, more preferably in the range of 48 to 52 wt.-% and still more preferably is 50 wt.-% based on the overall weight of the polymer composition.

Still a further preferred embodiment of the present invention stipulates that the content of polypropylene a1) in component A) is in the range from 75 to 95 wt.-% and preferably in the range from 83 to 93 wt.-% based on the overall weight of component A). The content of polypropylene a1) in component A) may be determined by FTIR spectroscopy as described in the experimental section. More preferably component a1) comprises more than 95 wt.-%, preferably from 96 to 99.9 wt.-% isotactic polypropylene and most preferably consists of isotactic polypropylene.

In another preferred embodiment of the present invention the content of polyethylene a2) in component A) is in the range from 5 to 25 wt.-% and preferably in the range from 7 to 17 wt.-% based on the overall weight of component A). The content of polyethylene a1) in component A) may be determined by FTIR spectroscopy as described in the experimental section. More, preferably component a1) consists of homopolyethylene and ethylene containing copolymers.

Still a further preferred embodiment of the present invention stipulates that the ratio of polypropylene a1) to polyethylene a2) is from 5:2 to 12:1, preferably from 7:1 to 10:1 and, more preferably from 8:1 to 9.5:1.

Another preferred embodiment of the present invention stipulates that the melt enthalpy of component a2)/melt enthalpy of a1) in the polymer composition is in the range of 0.2 to 2.0 and preferably in the range of 0.25 to 1.75.

In a further preferred embodiment the polypropylene a1) comprises one or more polymer materials selected from the following:

I) isotactic or mainly isotactic propylene homopolymers;

II) isotactic random copolymers of propylene with ethylene and/or C4-C8 alpha-olefins, such as 1-butene or 1-octene, wherein the total comonomer content ranges from 0.05 to 20 wt.-%, or mixtures of said copolymers with isotactic or mainly isotactic propylene homopolymers;

III) heterophasic copolymers comprising an isotactic propylene homopolymer like (I) or random copolymers of propylene like (II), and an elastomeric fraction comprising copolymers of ethylene with propylene and/or a C4-C8 a-olefin, such as 1-butene or 1-octene, optionally containing minor amounts of a diene, such as butadiene, 1,4-hexadiene, 1,5-hexadiene, ethylidene-1-norbornene.

A further preferred embodiment of the present invention stipulates that component a1) has a density in the range of 0.895 to 0.920 $g/cm^3$, preferably in the range of 0.900 to 0.915 $g/cm^3$ as determined in accordance with ISO 1183.

According to still a further embodiment of the present invention the melt flow rate (MFR) of component a1) is in the range of 0.5 to 300 g/10 min, preferably in the range of 1.0 to 150 g/10 min and alternatively in the range of 1.5 to 50 g/10 min as determined in accordance with ISO 1133 (at 230° C.; 2.16 kg load).

In another preferred embodiment of the present invention the melting temperature of component a1) is within the range of 130 to 170° C., preferably in the range of 140 to 168° C. and more preferably in the range of 142 to 166° C. In case it is a propylene homopolymer like item (I) above it will have a melting temperature in the range of 150 to 170° C., preferably in the range from 155 to 168° C. and more preferably in the range of 160 to 166° C. as determined by differential scanning calorimetry (DSC) according to ISO 11357-3. In case it is a random copolymer of propylene like item (II) above it will have a melting temperature in the range of 130 to 162° C., preferably in the range of 135 to 160° C. and more preferably in the range of 140 to 158° C. as determined by DSC according to ISO 11357-3.

The polyethylene a2) is preferably a high density polyethylene (HDPE) or a linear low density polyethylene (LLDPE) or a long-chain branched low density polyethylene (LDPE). The comonomer content of component a2) is usually below 50 wt.-% preferably below 25 wt.-%, and most preferably below 15 wt.-%.

Herein a HDPE suitable for use as component a2) has a density as determined according to ISO 1183 of equal to or greater than 0.941 $g/cm^3$, preferably in the range of 0.941 to 0.965 $g/cm^3$ and more preferably in the range of 0.945 to 0.960 $g/cm^3$.

According to another preferred embodiment, the HDPE is an ethylene homopolymer. A HDPE suitable for use as component a2) in this disclosure generally has a MFR determined by ISO 1133 (at 190° C.; 2.16 kg load), in the range of 0.01 g/10 min to 50 g/10 min, preferably in the range of 0.1 to 30 g/10 min, like in the range of 0.5 to 20 g/10 min.

The HDPE may also be a copolymer, for example a copolymer of ethylene with one or more alpha-olefin monomers such as propylene, butene, hexene, etc.

A LLDPE suitable for use as component a2) in this disclosure generally has a density as determined with ISO 1183, in the range of 0.900 to 0.920 $g/cm^3$, or in the range of 0.905 to 0.918 $g/cm^3$, or in the range of 0.910 to 0.918 $g/cm^3$ and an MFR determined by ISO 1133 (at 190° C.; 2.16 kg load), in the range of 0.01 to 50 g/min, or in the range of 0.1 to 30 g/10 min, like in the range of 0.5 to 20 g/10 min. The LLDPE is a copolymer, for example a copolymer of ethylene with one or more alpha-olefin monomers such as propylene, butene, hexene, etc.

A LDPE suitable for use as component a2) in this disclosure generally has a density as determined with ISO 1183, in the range of 0.915 to 0.935 $g/cm^3$, and an MFR determined by ISO 1133 (190° C.; 2.16 kg), in the range of 0.01 to 20 g/min. The LDPE is an ethylene homopolymer.

According to a further preferred embodiment the melting temperature of component a2) is in the range from 100 to 135° C. and preferably in the range from 105 to 132° C.

Such post-consumer and/or post-industrial waste can be derived from inter alia waste electrical and electronic equipment (WEEE) or end-of-life vehicles (ELV) or from differentiated waste collection schemes like the German DSD system, the Austrian ARA system and the Austrian ASZ system (especially for Purpolen materials) or the Italian "Raccolta Differenziata" system.

Recycled materials are commercially available, e.g. from Corpela (Italian Consortium for the collection, recovery, recycling of packaging plastic wastes), Resource Plastics Corp. (Brampton, ON), Kruschitz GmbH, Plastics and Recycling (AT), Ecoplast (AT), Vogt Plastik GmbH (DE), mtm plastics GmbH (DE) etc.

A preferred recycled polymer blend is Purpolen PP, being a recycled polymer mixture comprising polyethylene and polypropylene obtained from mtm plastics GmbH, Niedergebra, Germany.

Component B)

The polymer composition in accordance with the present invention comprises as component B) 25 to 80 wt.-% based on the overall weight of the polymer composition of a virgin heterophasic polypropylene block copolymer. Said virgin heterophasic polypropylene block copolymer has a xylene soluble content (XCS) determined according to ISO 16152 based on the overall weight of component B) in the range of 8 to 30 wt.-%, a C2-content in the range of 2.0 to 12.0 wt.-% and a $MFR_2$ (230° C., 2.16 kg) determined according to ISO 1133 in the range of 30 to 55 g/10 min.

Preferred embodiments of component B) will be discussed in the following.

According to one preferred embodiment of the present invention component B) is a heterophasic polypropylene block copolymer consisting of units derived from propylene and ethylene, whereby the content of units derived from ethylene is preferably in the range of 2.0 to 12.0 wt.-%, more preferably in the range of 3.0 to 10.0 wt.-% and still more preferably in the range of 5.0 to 8.0 wt.-%.

A further preferred embodiment of the present invention stipulates that component B) has a xylene soluble content (XCS) determined according to ISO 16152, 1ed, 25° C., based on the overall weight of component B) in the range of 10.0 to 28.0 wt.-%, preferably in the range of 11.0 to 20.0 wt.-% and more preferably in the range of 13.0 to 17.0 wt.-%.

Still another preferred embodiment of the present invention stipulates that component B) has a C2-content in the range of 3.0 to 10.0 wt.-%, preferably in the range of 4.0 to 10.0 wt.-%, more preferably in the range of 5.0 to 8.0 wt.-% and still more preferably in the range of 6.0 to 8.0 wt.-%.

Still a further preferred embodiment stipulates that component B) has a C2-content of the xylene soluble fraction C2 (XCS) based on the overall weight of component B) in the range from 25 to 45 wt.-%, preferably from 28 to 40 wt.-% and more preferably in the range from in the range from 30 to 38 wt.-%.

According to a further preferred embodiment of the present invention component B) has a C3-content >85 wt.-%. More preferably, component B) comprises no other units than units derived from ethylene and propene. Still more preferably the C3-content in component B) is the range of 90.0 to 97.0 wt.-%, preferably in the range of 97.0 to 96.0 wt.-%, more preferably in the range of 92.0 to 95.0 wt.-% and still more preferably in the range of 92.0 to 94.0 wt.-%.

According to another preferred embodiment of the present invention the $MFR_2$ (230° C., 2.16 kg) determined according to ISO 1133 of component B) is in the range of 32 to 50 g/10 min and preferably in the range of 40 to 45 g/10 min.

In a further preferred embodiment of the present invention component B) has a tensile modulus measured according to ISO527-2 in the range of 1000 to 1700 MPa, preferably in the range of 1100 to 1600 MPa and more preferably in the range of 1300 to 1400 MPa.

According to a further preferred embodiment of the present invention component B) has a Charpy Notched Impact Strength measured according to ISO 179-1eA at 23° C. in the range of 3.0 to 7.0 $kJ/m^2$, preferably in the range of 4.0 to 6.0 $kJ/m^2$ and more preferably in the range of 5.0 to 6.0 $kJ/m^2$.

Another preferred embodiment of the present invention stipulates that the content of component B) in the polymer composition is in the range of 25 to 80 wt.-%, preferably in the range of 45 to 55 wt.-%, more preferably in the range of 48 to 52 wt.-% and still more preferably is 50 wt.-% based on the overall weight of the polymer composition.

Conditions for manufacturing component B) are inter alia described in EP 3 015 504 A1.

Component B) can be produced in a multistage process comprising at least two reactors connected in series, wherein the polypropylene homopolymer matrix is produced first and in a subsequent step the propylene copolymer is produced in the presence of the matrix or by blending the matrix polymer with the propylene copolymer after their polymerization. However, more desirably, component B) is produced in a multistage process.

A preferred multistage process for manufacturing component B) is a "loop-gas phase"-process, such as developed by Borealis (known as BORSTAR® technology) which is described e.g. in patent literature, such as in EP 0 887 379 A1, WO 92/12182 A1, WO 2004/000899 A1, WO 2004/111095 A1, WO 99/24478 A1, WO 99/24479 A1 or in WO 00/68315 A1. A further suitable slurry-gas phase process is the Spheripol® process of Basell.

Suitable catalysts systems for manufacturing component B) comprise a) a Ziegler-Natta catalyst comprising compounds (TC) of a transition metal of Group 4 to 6 of IUPAC, a Group 2 metal compound and an internal donor. In one embodiment, said internal donor is a phthalic compound. In another embodiment, said internal donor is a non-phthalic compound, preferably a non-phthalic acid ester. The internal donor is preferably selected from substituted malonates, maleates, succinates, glutarates, cyclohexene-1,2-dicarboxylates, benzoates and derivatives and/or mixtures thereof, preferably the internal donor is a citraconate. Catalysts systems for manufacturing component B) further comprise b) a co-catalyst (Co), and c) optionally an external donor (ED).

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein. Detailed description of preparation of catalysts is disclosed in WO 2012/007430 A1, EP 2 610 270 A1, EP 2 610 271 A1 and EP 2 610 272 A1 which are incorporated here by reference.

The precise control of the prepolymerization conditions and reaction parameters is within the skills of the person skilled in the art.

Additives

The polymer composition according to the present invention may also comprise additives.

According to a preferred embodiment of the present invention the polymer composition comprises at least one additive, preferably selected from the group consisting of slip agents, antiblocking agents, UV-stabilisers, pigments, antioxidants, anti-acids, additive carriers, nucleating agents and mixtures thereof, whereby these additives preferably are present in 0 to 5 wt.-% and more preferably in 0.1 to 4 wt.-% based on the overall weight of the polymer composition.

Examples of antioxidants which may be used, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl) diphenylamine), or antioxidant blends.

Examples for anti-acids which may be used in the polymer compositions according to the present invention are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1).

Antiblocking agents that may be used in the polymer compositions according to the present invention are natural silica such as diatomaceous earth (such as CAS No. 60676-86-0 (SuperFloss™), CAS-No. 60676-86-0 (SuperFloss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminum silicate (Kaolin) CAS-no. 1318-74-7, sodium aluminum silicate CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0).

UV-stabilizers which might be used in the polymer compositions according to the present invention are, for example, Bis-(2,2,6,6-tetramethyl-4-piperidyl)-sebacate (CAS-No. 52829-07-9, Tinuvin 770); 2-hydroxy-4-(octyloxy)benzophenone (CAS-No. 1843-05-6, Chimassorb 81).

Nucleating agents that can be used in the polymer compositions according to the present invention are for example sodium benzoate (CAS No. 532-32-1) or 1,3:2,4-bis(3,4-dimethylbenzylidene)sorbitol (CAS 135861-56-2, Millad 3988).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Polymer Composition

Below preferred embodiments of the polymer composition according to the present invention will be discussed.

According to one preferred embodiment of the present invention the polymer composition has a $MFR_2$ (230° C., 2.16 kg) determined according to ISO 1133 in the range of 1 to 50 g/10 min, preferably in the range of 1.5 to 35 g/10 min, more preferably in the range of 15 to 30 g/10 min and most preferably in the range of 24 to 28 g/10 min.

In another preferred embodiment of the present invention the polymer composition has a Tensile Modulus measured according to ISO527-2 in the range of 800 to 1700 MPa, preferably in the range of 1100 to 1500 MPa and more preferably in the range of 1300 to 1400 MPa.

Still another preferred embodiment of the present invention stipulates that the polymer composition has a Charpy Notched Impact Strength measured according to ISO 179-1eA at 23° C. of more than 5.0 kJ/$m^2$, preferably in the range of 5.0 to 15.0 kJ/$m^2$, more preferably in the range of 5.5 to 7.0 kJ/$m^2$ and still more preferably in the range of 5.8 to 6.5 kJ/$m^2$.

According to another preferred embodiment of the present invention the polymer composition has an oxidation induction time measured according to ASTM-D3895 of more than 40 minutes, preferably in the range of 40 to 80 minutes and more preferably in the range of 45 to 65 minutes.

A further preferred embodiment of the present invention stipulates that the polymer composition has a higher Charpy Notched Impact Strength measured according to ISO 179-1eA at 23° C., preferably at least 5% higher, more preferably from 5 to 25% higher than the same polymer composition without component B).

In another preferred embodiment of the present invention the polymer composition has a higher Tensile Modulus measured according to ISO527-2, preferably at least 5% higher, more preferably from 5 to 15% higher than the same polymer composition without component B).

Still another preferred embodiment of the present invention stipulates that the polymer composition has a higher $MFR_2$ (230° C., 2.16 kg) determined according to ISO 1133, preferably at least 10% higher, more preferably from 10 to 40% higher than the same polymer composition without component B).

According to a further preferred embodiment of the present invention the content of component A) in the polymer composition is in the range of 40 to 60 wt.-%, preferably in the range of 45 to 55 wt.-%, more preferably in the range from 48 to 52 wt.-% and still more preferably is 50 wt.-% based on the overall weight of the polymer composition.

In another preferred embodiment of the present invention the content of component B) in the polymer composition is in the range of 40 to 60 wt.-%, preferably in the range of 45 to 55 wt.-%, more preferably in the range of 48 to 52 wt.-%, and still more preferably is 50 wt.-% based on the overall weight of the polymer composition.

A preferred polymer composition according to the present invention comprises at least the following components A) 40 to 55 wt.-%, preferably 45 to 52 wt.-% based on the overall weight of the polymer composition of a polymer blend, comprising
  - a1) polypropylene;
  - a2) polyethylene;
  - wherein the weight ratio of a1) to a2) is from 3:7 to 12:1, preferably from 5:2 to 12:1, more preferably from 7:1 to 10:1, and still more preferably from 8:1 to 9.5:1; and
  - wherein the polymer blend A) is a recycled material;

B) 45 to 60 wt.-%, preferably 48 to 55 wt.-% based on the overall weight of the polymer composition of a heterophasic polypropylene block copolymer;
  - whereby said heterophasic polypropylene block copolymer has
    - a xylene soluble content (XCS) determined according to ISO 16152 based on the overall weight of component B) in the range of 10 to 18 wt.-% and preferably of 13 to 17 wt.-%;
    - a C2-content in the range of 3.0 to 10.0 wt.-% and preferably in the range of 5.0 to 8.0 wt.-%;
    - a $MFR_2$ (230° C., 2.16 kg) determined according to ISO 1133 in the range of 30 to 45 g/10 min and preferably in the range of 40 to 45 g/10 min;

with the proviso that the weight proportions of components A) and B) add up to 100 wt.-%.

A preferred polymer composition according to the present invention consists of the following components A) 40 to 55 wt.-%, preferably 45 to 52 wt.-% based on the overall weight of the polymer composition of a polymer blend, comprising a1) polypropylene;

a2) polyethylene;

wherein the weight ratio of a1) to a2) is from 3:7 to 12:1, preferably from 5:2 to 12:1, more preferably from 7:1 to 10:1, and still more preferably from 8:1 to 9.5:1; and wherein the polymer blend A) is a recycled material;

B) 45 to 58 wt.-%, preferably 47.9 to 53.5 wt.-% based on the overall weight of the polymer composition of a heterophasic polypropylene block copolymer;

whereby said heterophasic polypropylene block copolymer has a xylene soluble content (XCS) determined according to ISO 16152 based on the overall weight of component B) in the range of 10 to 18 wt.-% and preferably of 13 to 17 wt.-%;

a C2-content in the range of 3.0 to 10.0 wt.-% and preferably in the range of 5.0 to 8.0 wt.-%;

a $MFR_2$ (230° C., 2.16 kg) determined according to ISO 1133 in the range of 30 to 45 g/10 min and preferably in the range of 40 to 45 g/10 min;

C) 0 to 2 wt.-%, preferably 0.1 to 1.5 wt.-% of additives selected from the group consisting of slip agents, antiblocking agents, UV-stabilisers, pigments, antioxidants, anti-acids, additive carriers, nucleating agents, preferably antioxidants;

with the proviso that the weight proportions of components A), B) and C) add up to 100 wt.-%.

Process

The process for manufacturing a polymer composition according to the present invention comprises the following steps:

i) providing a polymer blend A) of a recycled material comprising a1) polypropylene and a2) polyethylene in a weight ratio of a1) to a2) from 3:7 to 12:1 in an amount of 20 to 75 wt.-% based on the overall weight of the polymer composition;

ii) providing a virgin heterophasic polypropylene block copolymer B) in an amount of 25 to 80 wt.-% based on the overall weight of the polymer composition; whereby said heterophasic polypropylene block copolymer has a xylene soluble content (XCS) determined according to ISO 16152 based on the overall weight of component B) in the range of 8 to 30 wt.-%;

a C2-content in the range from 2.0 to 12.0 wt.-%; and a $MFR_2$ (230° C., 2.16 kg) determined according to ISO 1133 in the range of 30 to 55 g/10 min;

iii) melting and mixing components A) and B) to obtain the polymer composition; and iv) optionally, cooling down the polymer composition obtained in step iii) and/or pelletizing the polymer composition.

According to a preferred embodiment of the process according to the present invention component B) is a heterophasic polypropylene block copolymer consisting of units derived from propylene and ethylene, whereby the content of units derived from ethylene is in the range of 2 to 12 wt.-%, preferably in the range of 3 to 10 wt.-% and more preferably in the range of 5 to 8 wt.-%.

Still another preferred embodiment of the process according to the present invention stipulates that component B) has a xylene soluble content (XCS) determined according to ISO 16152, 1ed, 25° C., based on the overall weight of component B) in the range of 10.0 to 28.0 wt.-%, preferably in the range of 11 to 20 wt.-% and more preferably in the range of 13 to 17 wt.-%.

According to a further preferred embodiment of the process according to the present invention the $MFR_2$ (230° C., 2.16 kg) determined according to ISO 1133 of component B) is in the range of 32 to 50 g/10 min and preferably in the range of 40 to 45 g/10 min.

Still another preferred embodiment of the process according to the present invention stipulates that component B) has a tensile modulus measured according to ISO527-2 in the range of 1000 to 1700 MPa, preferably in the range of 1100 to 1600 MPa and more preferably in the range of 1300 to 1400 MPa.

In a further preferred embodiment of the process according to the present invention component B) has a Charpy Notched Impact Strength measured according to ISO 179-1eA at 23° C. in the range of 3 to 7 $kJ/m^2$, preferably in the range of 4 to 6 $kJ/m^2$ and more preferably in the range of 5 to 6 $kJ/m^2$.

According to another preferred embodiment of the process according to the present invention the chemical composition of component A) and/or the $MFR_2$ (230° C., 2.16 kg) determined according to ISO 1133 and/or the tensile modulus measured according to ISO527-2 and/or component B) has a Charpy Notched Impact Strength measured according to ISO 179-1eA at 23° C. is/are determined before adding component (B).

The composition of the commercially available recyclates is subject to slight fluctuations. The determination of the mechanical properties and/or the MFR of component A) before adding component B) allows to compensate these fluctuations by adding an appropriate amount of component B).

All preferred aspects and embodiments as described above shall also hold for the process according to the present invention.

Use

The present invention also relates to the use of a virgin heterophasic polypropylene block copolymer B); whereby said heterophasic polypropylene block copolymer B) has a xylene soluble content (XCS) determined according to ISO 16152 based on the overall weight of component B) in the range of 8 to 30 wt.-%;

a C2-content in the range from 2.0 to 12.0 wt.-%; and a $MFR_2$ (230° C., 2.16 kg) determined according to ISO 1133 in the range of 30 to 55 g/10 min;

for increasing the Charpy Notched Impact Strength measured according to ISO 179-1eA at 23° C.; and/or the Tensile Modulus measured according to ISO527-2; and/or the $MFR_2$ (230° C., 2.16 kg) determined according to ISO 1133;

of a polymer blend A) of a recycled material comprising a1) polypropylene and a2) polyethylene in a weight ratio of a1) to a2) from 3:7 to 12:1;

whereby the heterophasic polypropylene block copolymer B) is present in amount of 25 to 80 wt.-% based on the overall weight of components A) and B).

According to a preferred embodiment of the use according to the present invention the Charpy Notched Impact Strength of component A) measured according to ISO 179-1eA at 23° C. is increased by at least 5% and preferably by 5 to 25%.

Still another preferred embodiment of the use according to the present invention stipulates that the Tensile Modulus of component A) measured according to ISO527-2 is increased by at least 5% and preferably by 5 to 15%.

In a further preferred embodiment of the use according to the present invention the $MFR_2$ (230° C., 2.16 kg) of component A) determined according to ISO 1133, is increased by at least 10%, preferably by 10 to 40%.

According to a further preferred embodiment of the use according to the present invention component B) is a heterophasic polypropylene block copolymer consisting of units derived from propylene and ethylene, whereby the content of units derived from ethylene is in the range of 2 to 12 wt.-%, preferably in the range of 3 to 10 wt.-% and more preferably in the range of 5 to 8 wt.-%.

Still another preferred embodiment of the use according to the present invention stipulates that component B) has a xylene soluble content (XCS) determined according to ISO 16152, $1^{ed}$, 25° C., based on the overall weight of component B) in the range of 10 to 28 wt.-%, preferably in the range of 11 to 20 wt.-% and more preferably in the range of 13 to 17 wt.-%.

In a further preferred embodiment of the use according to the present invention the $MFR_2$ (230° C., 2.16 kg) determined according to ISO 1133 of component B) is in the range of 32 to 50 g/10 min and preferably in the range of 40 to 45 g/10 min.

According to a further preferred embodiment of the use according to the present 30 invention component B) has a tensile modulus measured according to ISO527-2 in the range of 1000 to 1700 MPa, preferably in the range of 1100 to 1600 MPa and more preferably in the range of 1300 to 1400 MPa.

Still another preferred embodiment of the use according to the present invention stipulates that component B) has a Charpy Notched Impact Strength measured according to ISO 179-1eA at 23° C. in the range of 3 to 7 kJ/$m^2$, preferably in the range of 4 to 6 kJ/$m^2$ and more preferably in the range of 5 to 6 kJ/$m^2$.

All preferred aspects and embodiments as described above shall also hold for the use according to the present invention.

Article

The present invention also relates to an article comprising the polymer composition according to the present invention. It is preferred that the article comprises at least 95 wt.-% based on its overall weight of the polymer composition according to the present invention.

According to a preferred embodiment of the present invention the article is selected from the group consisting of consumer goods or houseware, preferably caps, closures and packaging containers, more preferably thin wall packaging containers.

All preferred aspects and embodiments as described above shall also hold for the article.

The invention will now be described with reference to the following non-limiting examples.

Experimental Part

A. Measuring Methods

The following definitions of terms and determination methods apply for the above general description of the invention as well as to the below examples unless otherwise defined.

Melt Flow Rate (MFR)

MFR was measured according to ISO 1133 at a load of 2.16 kg, at 230° C. for polypropylene and MFR was measured according to ISO 1133 at a load of 2.16 kg at 190° C. for polyethylene.

Melting Temperature $T_m$, Crystallization Temperature $T_c$ and Melting Enthalpy $H_m$.

The melting temperature was determined with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) is determined from the cooling step, while melting temperature ($T_m$) and melting enthalpy ($H_m$) are determined from the second heating step. For calculating the melting enthalpy 50° C. is used as lower integration limit. Melting and crystallization temperatures were taken as the peaks of endotherms and exotherms.

Tensile Modulus, Tensile Strength, Tensile Strain at Break, Tensile Strain at Tensile Strength, Tensile Stress at Break The measurements were conducted after 96 h conditioning time (at 23° C. at 50% relative humidity) of the test specimen.

Tensile Modulus was measured according to ISO 527-2 (cross head speed=1 mm/min; 23° C.) using injection molded specimens as described in EN ISO 1873-2 (dog bone shape, 4 mm thickness).

Tensile Strength was measured according to ISO 527-2 using injection molded specimens as described in EN ISO 1873-2 (170×10×4 mm).

Tensile Strain at Break was measured according to ISO 527-2 (cross head speed=50 mm/min; 23° C.) using injection molded specimens as described in EN ISO 1873-2 (dog bone shape, 4 mm thickness).

Tensile Strain at Tensile Strength was determined according to ISO 527-2 with an elongation rate of 50 mm/min until the specimen broke using injection molded specimens as described in EN ISO 1873-2 (dog bone shape, 4 mm thickness). Tensile Stress at Break was determined according to ISO 527-2 (cross head speed=50 mm/min) on samples prepared from compression-molded plaques having a sample thickness of 4 mm.

Charpy Notched Impact Strength

Charpy Notched impact strength was determined (after 96 hours of conditioning at 23° C. and 50% relative humidity) according to ISO 179 1eA at 23° C. and −20° C. using 80×10×4 $mm^3$ test bars injection molded in line with EN ISO 1873-2.

Xylene Cold Solubles (XCS)

The xylene soluble (XS) fraction as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\%=(100*m*V_0)/(m_0*v);$$

$m_0$=initial polymer amount (g); m=weight of residue (g); $V_0$=initial volume (ml); v=volume of analyzed sample (ml).

Density

Density of the materials was measured according to ISO 1183-1.

Oxidation Induction Time

The oxidation induction time (OIT) at 200° C. was determined with a TA Instrument Q20 according to ISO11357-6. Calibration of the instrument was performed with Indium and Tin, according to ISO 11357-1. The maximum error in temperature from calibration was less than 0.1 K. Each polymer sample (cylindrical geometry with a diameter of 5 mm and thickness of 1±0.1 mm) with a weight of 10±2 mg was placed in an open aluminium crucible, heated from 25° C. to 200° C. at a rate of 20° C. $min^{-1}$ in nitrogen (>99.95 vol. % $N_2$, <5 ppm $O_2$) with a gas flow rate of 50 mL $min^{-1}$, and allowed to rest for 5 min before the atmosphere was switched to pure oxygen (>99.95 vol. % $O_2$), also at a flow rate of 50 mL $min^{-1}$. The samples were maintained at constant temperature, and the exothermal heat associated with oxidation was recorded. The oxidation induction time was the time interval between the initiation of oxygen flow and the onset of the oxidative reaction. Each presented data point was the average of three independent measurements.

Determination of the C2- and C3-Content in Component B) by NMR

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\text{-}\%]=100*fE$$

The weight percent comonomer incorporation was calculated from the mole fraction:

$$E[\text{wt.-\%}]=100*(fE*28.06)/((fE*28.06)+((1-fE)*42.08))$$

Determination of the Content of Isotactic Polypropylene (iPP), Polystyrene (PS), Ethylene and Polyamide-6 in Component A)

Calibration standards were prepared by blending iPP and HDPE to create a calibration curve. The thickness of the films of the calibration standards were 300 µm. For the quantification of the iPP, PS and PA 6 content in the samples quantitative IR spectra were recorded in the solid-state using a Bruker Vertex 70 FTIR spectrometer. Spectra were recorded on 25×25 mm square films of 50-100 µm thickness prepared by compression molding at 190° C. and 4 to 6 mPa. Standard transmission FTIR spectroscopy was employed using a spectral range of 4000 to 400 $cm^{-1}$, an aperture of 6 mm, a spectral resolution of 2 $cm^{-1}$, 16 background scans, 16 spectrum scans, an interferogram zero filling factor of 32 and Norton Beer strong apodisation.

The absorption of the band at 1167 $cm^{-1}$ in iPP was measured and the iPP content was quantified according to a calibration curve (absorption/thickness in cm versus iPP content in wt.-%).

The absorption of the band at 1601 $cm^{-1}$ (PS) and 3300 $cm^{-1}$ (PA6) were measured and the PS- and PA6 content quantified according to the calibration curve (absorption/thickness in cm versus PS and PA content in wt.-%). The content of ethylene was obtained by subtracting the content of iPP, PS and PA6 from 100. The analysis was performed as double determination.

Amount of Talc and Chalk

The amount of talc and chalk were measured by Thermogravimetric Analysis (TGA); experiments were performed with a Perkin Elmer TGA 8000. Approximately 10 to 20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO2) was assigned to C02 evolving from CaCO3, and therefore the chalk content was evaluated as:

$$\text{Chalk content}=100/44\times WCO2$$

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

$$\text{Ash content}=(\text{Ash residue})-56/44\times WCO2-Wcb$$

Where Ash residue is the wt.-% measured at 900° C. in the first step conducted under nitrogen. The ash content is estimated to be the same as the talc content for the investigated recyclates.

Amount of Paper, Wood

Paper and wood is determined by conventional laboratory methods including milling, floatation, microscopy and Thermogravimetric Analysis (TGA).

Amount of Metals

The amount of metals is determined by x ray fluorescence (XRF).

Amount of Limonene

The amount of limonene is determined by solid phase microextraction (HS-SPME-GC-MS).

Amount of Total Fatty Acids

The amount of total fatty acids is determined by solid phase microextraction (HS-SPME-GC-MS).

B. Materials Used

Component A)

Polymer Blend (Purpolen)

Purpolen PP is a recycled polymer mixture comprising polyethylene and polypropylene obtained from mtm plastics GmbH, Niedergebra, Germany.

| | content of component a1) determined by FTIR | content of component a2) determined by FTIR |
|---|---|---|
| Purpolen 1 | 87.4 wt.-% | 10.5 wt.-% |
| Purpolen 2 | 87.6 wt.-% | 10.0 wt.-% |
| Purpolen 3 | 91.5 wt.-% | 7.0 wt.-% |

Purpolen 1 to 3 each individually add up with PS and PA 6 (content also determined by FTIR) to 100 wt.-%.

Component B)

The heterophasic polypropylene block copolymer used as "Component B" in the Working Examples was prepared in a sequential process comprising a prepolymerisation reactor, a loop reactor and two gas phase reactors (GPR1 and GPR2).

The catalyst used in the polymerization processes has been produced as follows: First, 0.1 mol of MgCl2×3 EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 0 491 566 A2, EP 0 591 224 B1 and EP 0 586 390 B1. The specific reaction conditions are summarized in Table 1.

TABLE 1

Preparation of the heterophasic propylene block copolymer "Component B".

| Parameter | unit | Component B |
|---|---|---|
| Prepolymerisation | | |
| temperature | [° C.] | 20 |
| pressure | [bar] | 55 |
| Al/donor ratio | [mol/mol] | 8 |
| Al/Ti ratio | [mol/mol] | 100 |
| residence time | [h] | 0.35 |
| Loop | | |
| temperature | [° C.] | 70 |
| pressure | [bar] | 55 |
| residence time | [h] | 0.35 |
| H2/C3 ratio | [mol/kmol] | 12 |
| C2 | [wt.-%] | 0 |
| XCS | [wt.-%] | 2.6 |
| MFR | [g/10 min] | 100 |
| Split | [wt.-%] | 40 |
| GPR1 | | |
| temperature | [° C.] | 85 |
| pressure | [bar] | 21 |
| residence time | [h] | 2.6 |
| H2/C3 ratio | [mol/kmol] | 83 |
| C2 | [wt-%] | 0 |
| XCS | [wt.-%] | 2.2 |
| MFR | [g/10 min] | 80 |
| Split | [wt.-%] | 45 |
| GPR2 | | |
| temperature | [° C.] | 75 |
| pressure | [bar] | 14.3 |
| residence time | [h] | 1.2 |
| H2/C2 ratio | [mol/kmol] | 130 |
| C2/C3 ratio | [mol/kmol] | 400 |
| C2 | [wt %] | 8.2 |
| XCS | [wt.-%] | 16.5 |
| MFR | [g/10 min] | 40 |
| Split | [wt.-%] | 15 |

TABLE 2

Properties of the heterophasic propylene block copolymer "Component B".

| Physical property | unit | "Component B" |
|---|---|---|
| MFR (230° C., 2.16 kg) | [g/10 min] | 45 |
| XCS total | [wt %] | 16.3 |
| C2 | [wt-%] | 7.5 |
| density | [kg/m$^3$] | 905 |

Further Components

Antioxidant (AO)

AO is Irganox B 215 (FF), commercially available from BASF SE.

C) Preparation of the Polymer Compositions

The polymer compositions according to the inventive examples (IE1 to IE3) and the comparative examples (CE1 to CE4) were prepared on a Coperion ZSK 25 co-rotating twin-screw extruder equipped with a mixing screw configuration with an L/D ratio of 25. A melt temperature of 170 to 225° C. was used during mixing, solidifying the melt strands in a water bath followed by strand pelletization. The amounts of the different components in the polymer compositions and the properties of the polymer compositions according to the inventive examples and the comparative examples can be gathered from below Table 1.

TABLE 3

Composition and properties of the polymer compositions.

| Component | Unit | IE1 | IE2 | IE3 | CE1 | CE2 | CE3 | CE4 |
|---|---|---|---|---|---|---|---|---|
| Purpolen 1 (A) | wt.-% | 50 | — | — | 100 | — | — | — |
| Purpolen 2 (A) | wt.-% | — | 50 | — | — | 100 | — | — |
| Purpolen 3 (A) | wt.-% | — | — | 50 | — | — | 100 | — |
| Component (B) | wt.-% | 49.5 | 49.5 | 49.5 | — | — | — | 100 |
| AO | wt.-% | 0.5 | 0.5 | 0.5 | — | — | — | — |
| Properties | | | | | | | | |
| MFR2 | g/10 min | 26.4 | 27.3 | 26.9 | 46 | 22.5 | 20.6 | 21.4 |
| Density | $kg/m^3$ | 916.6 | 916.2 | 915.5 | n.d. | n.d. | n.d. | n.d. |
| Tensile Strain at Break | % | 21.8 | 25.2 | 26.1 | n.d. | 13.5 | 13.1 | 13.5 |
| Tensile Strain at Tensile Strength | % | 5.0 | 4.9 | 5.0 | n.d. | 5.2 | 5.4 | 5.4 |
| Tensile Modulus | MPa | 1354 | 1359 | 1366 | 1357 | 1257 | 1260 | 1251 |
| Tensile Strength | MPa | 25.2 | 25.2 | 25.5 | n.d. | 25.0 | 25.0 | 25.0 |
| Tensile Stress at Break | MPa | 19.0 | 18.5 | 18.2 | n.d. | 20.5 | 20.6 | 13.5 |
| Charpy NIS 23° C. | $kJ/m^2$ | 6.3 | 6.0 | 5.9 | 5.4 | 5.2 | 5.4 | 5.4 |
| Charpy NIS −20° C. | $kJ/m^2$ | 3.0 | 3.3 | 3.0 | n.d. | n.d. | n.d. | n.d |
| OTT | min | 57.2 | 60.2 | 47.9 | n.d. | <10 | <10 | <10 |

n.d. = not determined.

D) Discussion of the Results

The polymer composition according to IE1 can be compared with the polymer composition according to CE1, the polymer composition according to IE2 is comparable to the polymer composition according to CE2 and the polymer composition according to IE3 can be compared with the polymer composition according to CE3, because the same polymer blend was used. CE4 reflects the properties of component B) used in all polymer compositions according to the invention (IE1 to IE3).

As can be gathered from Table 1, the polymer compositions according to the inventive examples show a higher toughness, expressed by the Charpy Notched Impact Strength at 23° C., than the polymer compositions according to the Comparative Examples. In addition, the MFR, the Tensile Strain at Break and the Tensile Modulus of the polymer compositions according to the Inventive Examples are higher, whereas the remaining tensile properties of the polymer compositions according to the Inventive Examples are on the same level than the tensile properties of the polymer compositions according to the Comparative Examples.

In addition, it was observed that the OIT of the polymer compositions according to the Inventive Examples (IE1 to IE3) is significantly higher than for the Comparative Examples.

From the experimental results, it can be seen that the specific combination of features allows to obtain polymer compositions having an excellent toughness, a good stiffness and excellent long term heat stabilization properties. The excellent long term heat stabilization properties allows that the polymer compositions can be subjected to additional re-processing and improves the recyclability.

The invention claimed is:

1. A polymer composition comprising at least the following components:

A) 40 to 60 wt.-% based on the overall weight of the polymer composition of a polymer blend, comprising a1) polypropylene; and a2) polyethylene;

wherein the weight ratio of a1) to a2) is from 3:7 to 12:1; and wherein the polymer blend A) is a recycled material comprising from 0.1 to 100 ppm of limonene, based on the overall weight of component A), as determined by solid phase microextraction (HS-SPME-GC-MS); and B) 40 to 60 wt.-% based on the overall weight of the polymer composition of a virgin heterophasic polypropylene block copolymer; wherein said virgin heterophasic polypropylene block copolymer has a xylene soluble content (XCS) determined according to ISO 16152 based on the overall weight of component B) in the range of 10 to 20 wt.-%;

a C2-content in the range of 3.0 to 10.0 wt.-%; and a $MFR_2$ (230° C., 2.16 kg) determined according to ISO 1133 in the range of 32 to 50 g/10 min;

with the proviso that the weight proportions of components A) and B) add up to 100 wt.-%;

wherein the polymer composition has at least 5% higher Charpy Notched Impact Strength measured according to ISO 179-1eA at 23° C. than the same polymer composition without component B).

2. The polymer composition according to claim 1, wherein component B) is a heterophasic polypropylene block copolymer consisting of units derived from propylene and ethylene; and/or component B) has a xylene soluble content (XCS) determined according to ISO 16152, led, 25° C., based on the overall weight of component B) in the range of 13.0 to 17.0 wt.-%; and/or component B) has a C2-content in the range of 5.0 to 8.0 wt.-%; and/or the $MFR_2$ (230° C., 2.16 kg) determined according to ISO 1133 of component B) is in the range of 40 to 50 g/10 min; and/or component B) has a tensile modulus measured according to ISO527-2 in the range of 1000 to 1700 MPa; and/or component B) has a Charpy Notched Impact Strength measured according to ISO 179-1eA at 23° C. in the range of 3.0 to 7.0 $KJ/m^2$.

3. The polymer composition according to claim 1, wherein component A) comprises 80.0 to 99.9 wt.-%, based on the overall weight of component A) of polypropylene a1) and polyethylene a2); and/or component A) comprises less than 5 wt.-%, based on the overall weight of component A) of thermoplastic polymers different from a1) and a2); and/or component A) comprises less than 5 wt.-%, based on the overall weight of component A) of talc; and/or component A) comprises less than 4 wt.-%, based on the overall weight of component A) of chalk; and/or component A) comprises less than 1 wt.-%, based on the overall weight of component A) of paper; and/or component A) comprises less than 1 wt.-%, based on the overall weight of component A) of wood; and/or component A) comprises less than 1 wt.-%, based on the overall weight of component A) of metal; and/or component A) comprises (i) from 1 ppm to 100 ppm, based on the overall weight of component A), of limonene, as determined by solid phase microextraction (HS-SPME-GC-MS); or (ii) from 0.10 ppm to less than 1 ppm, based on the overall weight of component A), of limonene, as determined by solid phase microextraction (HS-SPME-GC-MS); and/or component A) comprises 200 ppm or less, based on the overall weight of component A) of fatty acids; and/or component A) is a recycled material, which is recovered from waste plastic material derived from post-consumer and/or post-industrial waste; and/or the $MFR_2$ (230° C., 2.16 kg) determined according to ISO 1133 of component A) is in the range of 16 to 50 g/10; and/or the Charpy Notched Impact Strength measured according to ISO 179-1eA at 23° C. of component A) is more than 3.0 $KJ/m^2$; and/or the Tensile Modulus measured according to ISO527-2 of component A) is in the range of 800 to 1500.

4. The polymer composition according to claim 1, wherein the polymer composition has a $MFR_2$ (230° C., 2.16 kg) determined according to ISO 1133 in the range of 1 to 50 g/10 min; and/or a Tensile Modulus measured according to ISO527-2 in the range of 800 to 1700; and/or a Charpy Notched Impact Strength measured according to ISO 179-1eA at 23° C. of more than 5.0 $KJ/m^2$; and/or an oxidation induction time measured according to ASTM-D3895 of more than 40 minutes; and/or from 5 to 25% higher Charpy Notched Impact Strength measured according to ISO 179-1eA at 23° C. than the same polymer composition without component B); and/or an at least 5% higher Tensile Modulus measured according to ISO527-2 than the same polymer composition without component B); and/or an at least 10% higher $MFR_2$ (230° C., 2.16 kg) determined according to ISO 1133 than the same polymer composition without component B).

5. The polymer composition according to claim 1, wherein the content of component A) in the polymer composition is in the range of 45 to 55 wt.-%, based on the overall weight of the polymer composition; and/or the content of component B) in the polymer composition is in the range of 45 to 55 wt.-%, based on the overall weight of the polymer composition; and/or the content of polypropylene a1) in component A) is in the range from 75 to 95 wt.-%, based on the overall weight of component A); and/or the content of polyethylene a2) in component A) is in the range from 5 to 25 wt.-%, based on the overall weight of component A); and/or the ratio of polypropylene a1) to polyethylene a2) is from 7:1 to 10:1.

6. The polymer composition according to claim 1, wherein the polymer composition comprises at least one additive, selected from the group consisting of slip agents, anti-acids, UV-stabilisers, pigments, antioxidants, antiblock agents, additive carriers, and nucleating agents.

7. The polymer composition according to claim 1, wherein the polymer composition comprises at least the following components A) 40 to 55 wt.-%, based on the overall weight of the polymer composition of a polymer blend, comprising a1) polypropylene;

a2) polyethylene;

wherein the weight ratio of a1) to a2) is from 3:7 to 12:1; and wherein the polymer blend A) is a recycled material comprising from 0.1 to 100 ppm of limonene, based on the overall weight of component A), as determined by solid phase microextraction (HS-SPME-GC-MS);

B) 45 to 60 wt.-%, based on the overall weight of the polymer composition of a heterophasic polypropylene block copolymer; wherein said heterophasic polypropylene block copolymer has a xylene soluble content (XCS) determined according to ISO 16152 based on the overall weight of component B) in the range of 10 to 18 wt.-% a C2-content in the range of 3.0 to 10.0 wt.-%;

a $MFR_2$ (230° C., 2.16 kg) determined according to ISO 1133 in the range of 32 to 45 g/10 min;

with the proviso that the weight proportions of components A) and B) add up to 100 wt.-%.

8. An article comprising the polymer composition according to claim 1.

9. The article according to claim 8 selected from consumer goods or houseware.

* * * * *